US010576889B2

(12) United States Patent
Constantine

(10) Patent No.: US 10,576,889 B2
(45) Date of Patent: Mar. 3, 2020

(54) WIRELESS SENSOR OR DEVICE, PORTABLE OR DETACHABLE FROM EITHER A MOTORIZED OR UNMOTORIZED VEHICLE, CONNECTED VIA A PHONE OR ELECTRONIC TABLET APPLICATION SYSTEM

(71) Applicant: Danielle Constantine, Kingsville (AU)

(72) Inventor: Danielle Constantine, Kingsville (AU)

( * ) Notice: Subject to any disclaimer, the term of this patent is extended or adjusted under 35 U.S.C. 154(b) by 0 days.

(21) Appl. No.: 14/886,082

(22) Filed: Oct. 18, 2015

(65) Prior Publication Data
US 2017/0106794 A1   Apr. 20, 2017

(51) Int. Cl.
*B60Q 1/00* (2006.01)
*B60Q 9/00* (2006.01)
*B60Q 5/00* (2006.01)
*G08G 1/16* (2006.01)
*G08B 21/02* (2006.01)
*H04M 1/725* (2006.01)
*H04W 4/02* (2018.01)

(52) U.S. Cl.
CPC ............ *B60Q 9/008* (2013.01); *B60Q 5/006* (2013.01); *G08B 21/02* (2013.01); *G08G 1/162* (2013.01); *H04M 1/72569* (2013.01); *H04M 1/72572* (2013.01); *H04W 4/023* (2013.01)

(58) Field of Classification Search
CPC ........ B60Q 9/008; B60Q 5/006; G08G 1/162; H04W 4/023; H04M 1/72569; H04M 1/72572; G08B 21/02

USPC ........................................................ 340/435
See application file for complete search history.

(56) References Cited

U.S. PATENT DOCUMENTS

| 5,682,136 | A  | 10/1997 | Del Signore |
| 6,879,248 | B2 | 4/2005  | Flick |
| 7,046,127 | B2 | 5/2006  | Boddy |
| 7,139,591 | B2 | 11/2006 | Callaghan et al. |
| 7,248,892 | B2 | 7/2007  | White et al. |
| 7,341,264 | B2 | 3/2008  | Swannie |
| 7,365,641 | B2 | 4/2008  | Nou |
| 7,496,439 | B2 | 2/2009  | McCormick |
| 7,937,089 | B2 | 5/2011  | Smetters et al. |
| 8,260,537 | B2 | 9/2012  | Breed |
| 8,552,848 | B2 | 10/2013 | Rao et al. |
| 8,818,725 | B2 | 8/2014  | Ricci |

(Continued)

*Primary Examiner* — Tanmay K Shah
(74) *Attorney, Agent, or Firm* — Robert J. Craig

(57) ABSTRACT

This invention provides for a system of wireless sensor devices, portable or detachable from a vehicle, wirelessly connectable to a mobile electronic appliance and is particularly constructed as a reversing assistant for indicating the proximity between a vehicle and rearward obstacle objects. The sensor devices provided on the vehicle detect the proximity of an obstacle object to the rear of the vehicle and through a transmitter in the sensor devices provides a wireless signal to a receiver, in the mobile electronic appliance located with the driver of the vehicle. The wireless signal is processed by the electronic appliance and provides an indication of the distance between the vehicle and the object. The sensor devices are portable and detachable enabling them to be moved to and from different vehicles and by providing a mobile electronic appliance with wireless features, the reversing system can used by any vehicle eliminating the need to for a fixed wiring of proximity sensors on the vehicle.

7 Claims, 14 Drawing Sheets

(56) References Cited

U.S. PATENT DOCUMENTS

| | | | |
|---|---|---|---|
| 8,831,585 B2 | 9/2014 | Nicholson et al. | |
| 8,857,419 B2 | 10/2014 | Hansen | |
| 2009/0230262 A1* | 9/2009 | Chiu | B60R 11/04 |
| | | | 248/206.3 |
| 2013/0093582 A1 | 4/2013 | Walsh et al. | |
| 2013/0127641 A1* | 5/2013 | Groult | E04H 6/426 |
| | | | 340/932.2 |
| 2013/0188050 A1* | 7/2013 | Winget | G08G 1/168 |
| | | | 348/148 |

* cited by examiner

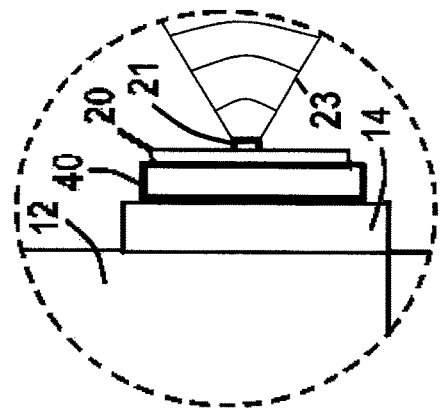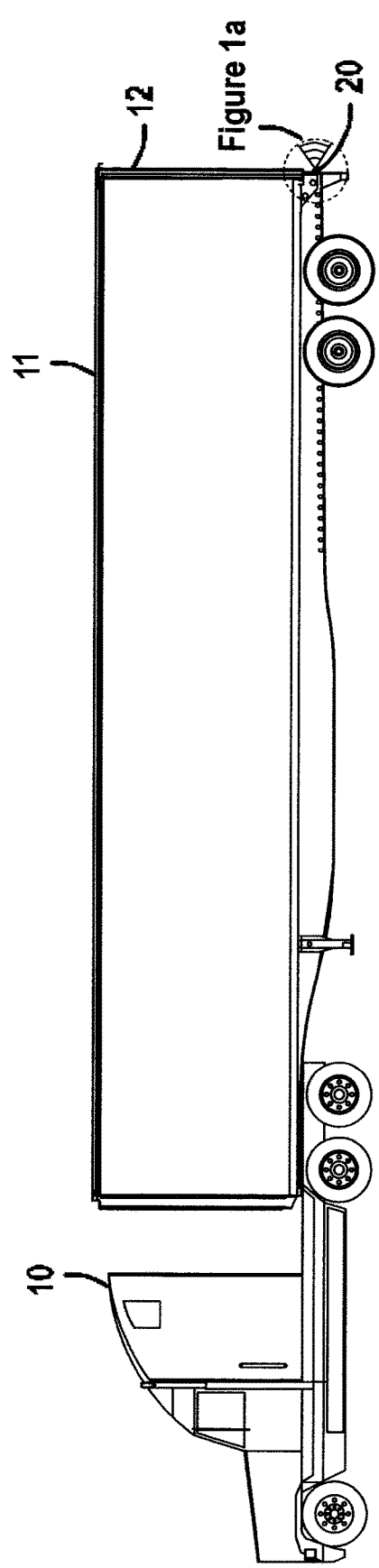
Figure 1a
Figure 1

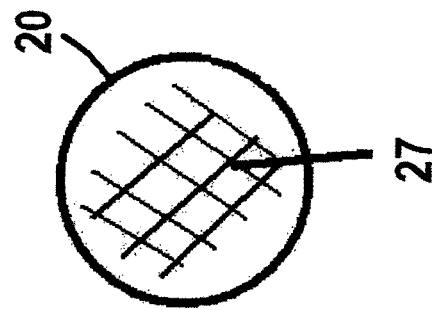
Figure 5c
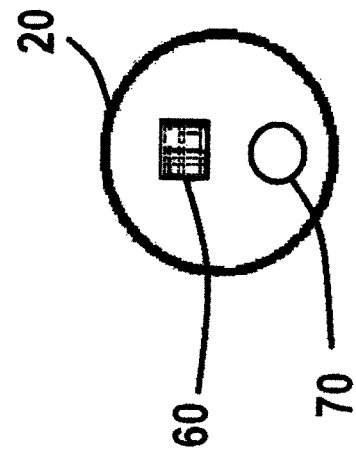
Figure 5f
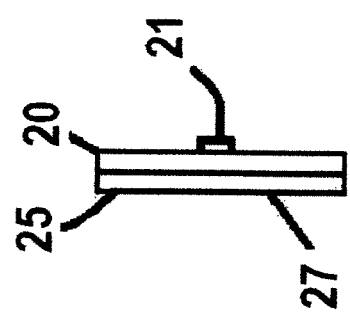
Figure 5b
Figure 5e
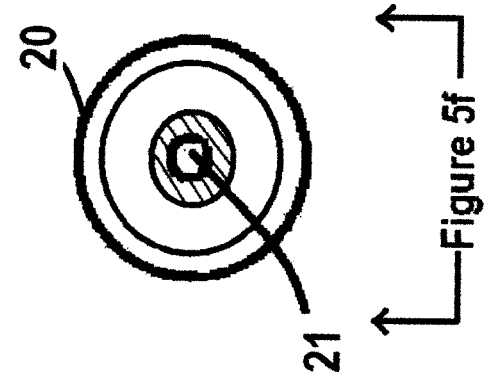
Figure 5a
Figure 5d

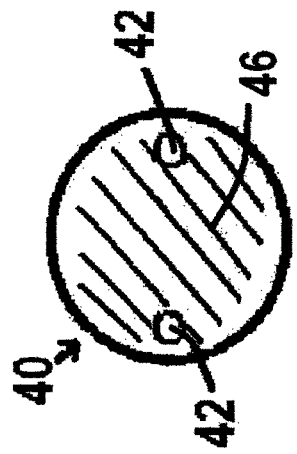
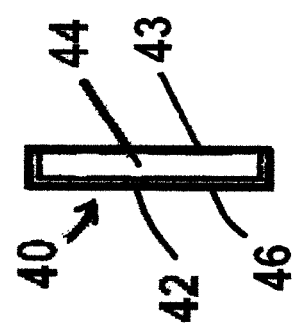
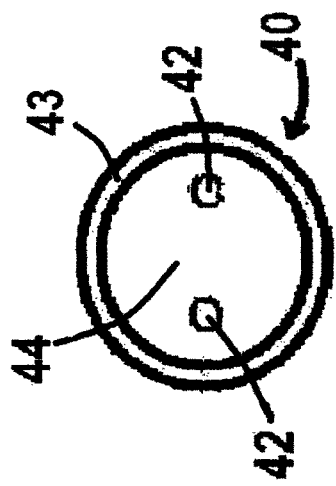
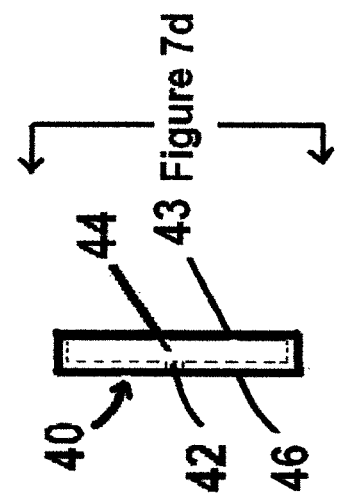
Figure 7b
Figure 7d
Figure 7a
Figure 7c

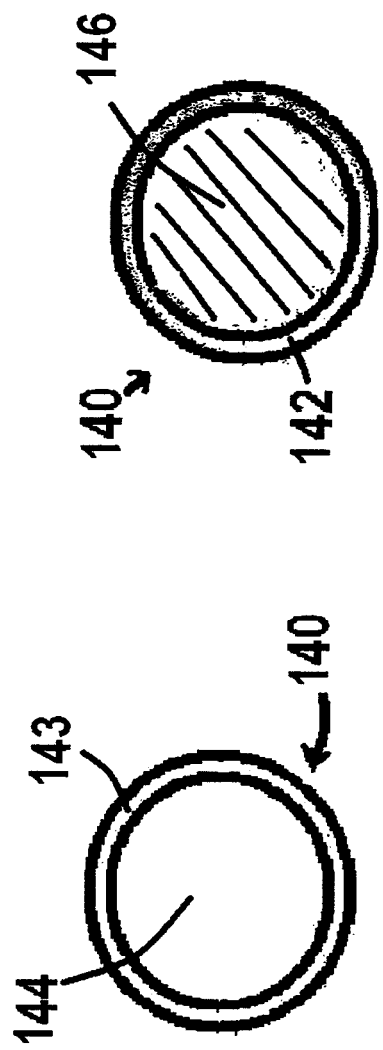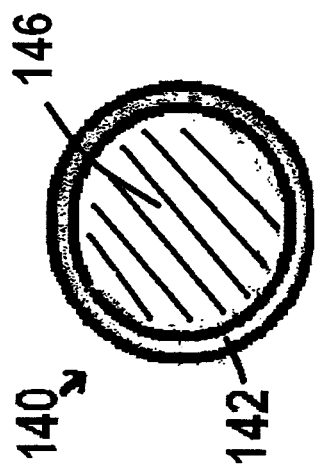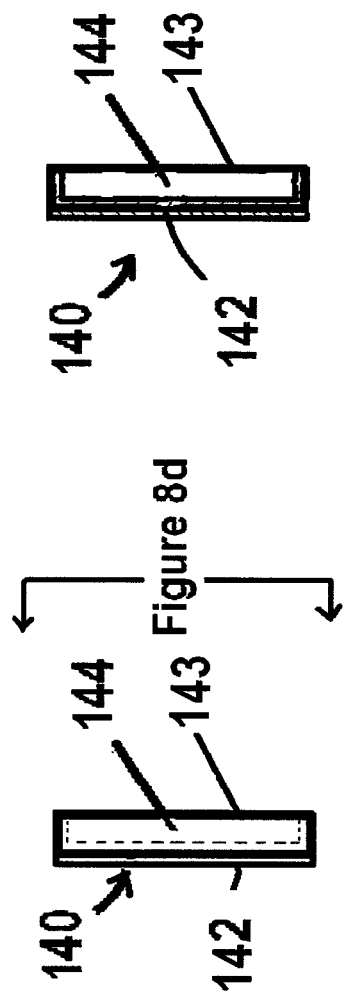

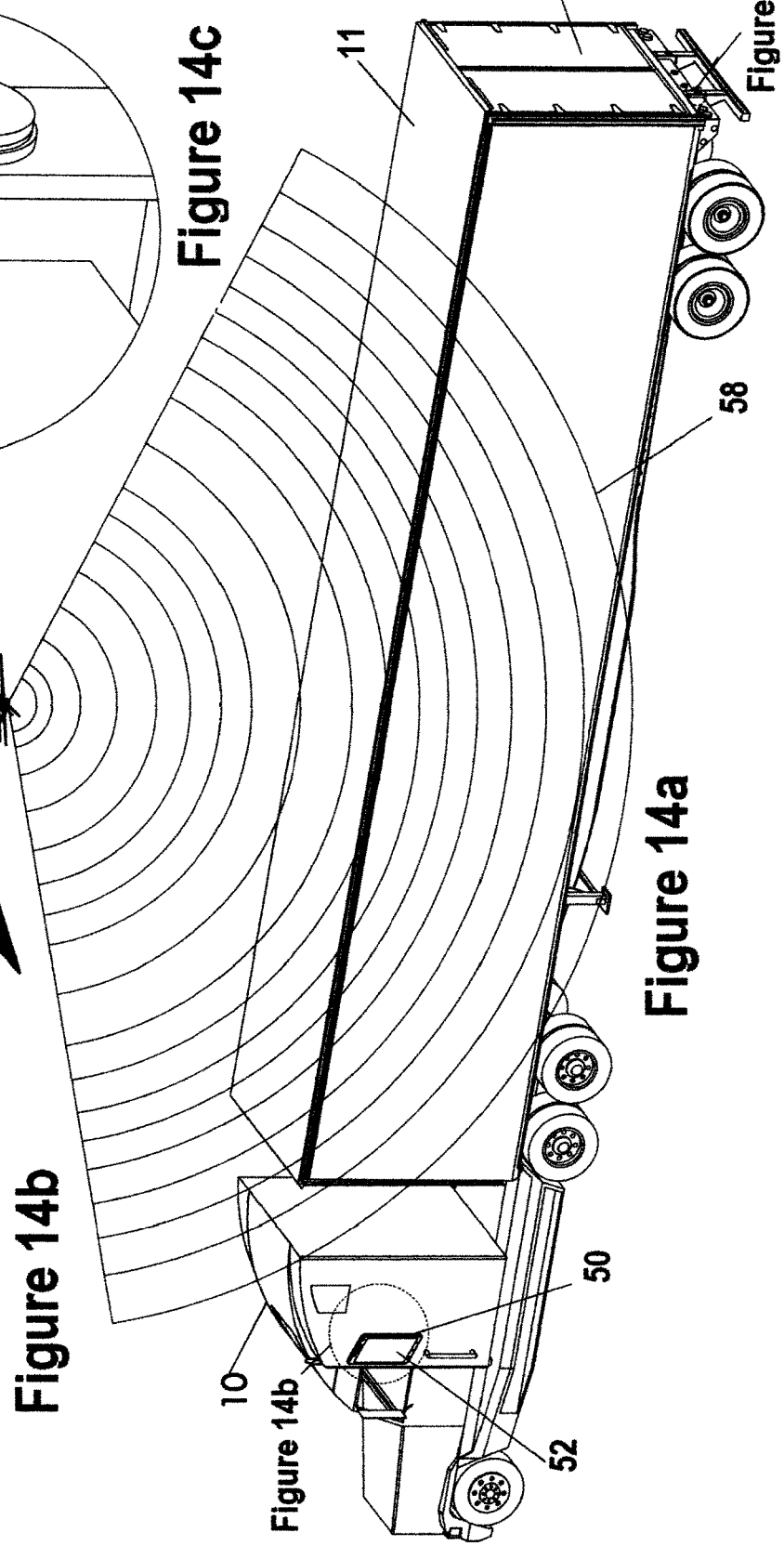

WIRELESS SENSOR OR DEVICE, PORTABLE OR DETACHABLE FROM EITHER A MOTORIZED OR UNMOTORIZED VEHICLE, CONNECTED VIA A PHONE OR ELECTRONIC TABLET APPLICATION SYSTEM

CROSS-REFERENCE TO RELATED APPLICATIONS

None.

FEDERALLY SPONSORED RESEARCH AND DEVELOPMENT

None.

APPENDICES

None.

DESCRIPTION

Field of the Invention

This invention relates to a wireless electronic reversing assistance, which is totally portable and detachable, both with proximity sensor devices and wireless communication transmitters and receivers for use and operation by a mobile electronic appliance particularly a smart phone, or electronic tablet.

BACKGROUND OF THE INVENTION

The operation of large motor vehicles, such as semi-tractor trailers, heavy haulage equipment, etc., often requires a driver to exercise considerable effort when attempting to move these tractor trailers in reverse, especially for loading and unloading operations. Although mirrors can be used to assist the driver, the driver's position in the cab may not provide the best vision for determining potential obstacles. Often time, the use of mirrors may have blind spots severely limiting complete vision for a successful reversing operation. Many vehicles are provided with proximity sensors to determine potential obstacles but these sensors are often hard wired in the vehicle and cannot be moved from vehicle to vehicle. Additionally, electromagnetic reverse parking sensor systems rely on fact that the vehicle moves slowly and smoothly towards an object to be avoided and once detected, the sensor gives a signal of presence of the object and for many systems, as the vehicle moves closer to the object the alarm signal becomes louder. Backup cameras are also provided in lieu of or in addition to reverse parking sensors; however these parking sensor systems used in motor vehicles are hard-wired and or are fixed in the motor vehicle and lack any capability of portability from one motor vehicle to another.

OBJECT OF THE INVENTION

It is an object of the present invention to overcome some of the difficulties and disadvantages with the prior art. An embodiment of the present invention provides an electronic reversing assistant for a vehicle with detachable or portable wireless sensor devices connected with by a smart phone, electronic tablet or other similar mobile electronic appliance.

SUMMARY OF THE INVENTION

This invention provides for wireless sensor devices, portable or detachable from either a motorized or un-motorized vehicle, electronically connected via a mobile electronic appliance, e.g., a smart phone, electronic tablet, etc. and is particularly constructed as a reversing assistant for indicating the proximity between a vehicle and objects to the rear of the vehicle. The sensor devices provided on the vehicle detect the proximity of an object to the rear of the vehicle and through transmitters provides wireless signals to a receiver, i.e. the mobile electronic appliance located with the driver of the vehicle. Additionally, the sensor devices are portable and detachable enabling them to be moved to and from different vehicles. The wireless signals sent from the sensor devices are processed by the mobile electronic appliance via imbedded computer processing unit and software applications and provides an indication of the distance between the vehicle and the object and allows the driver to adjust the rearward movement of the vehicle. By providing a mobile electronic appliance with the wireless communication capability and portability of the sensor devices, the reversing assistant can be fitted and used by any vehicles eliminating the need to for a fixed wiring of the sensor devices and electronic appliance to the vehicles.

Accordingly, in the preferred embodiment, the invention consists of a system for detecting the proximity of a potential obstacle object in the path of a reversing vehicle, motorized or un-motorized, and providing an indication to the vehicle driver of the proximity of the object. The system comprises a plurality of portable sensor devices, which are easily and readily attached and detachable from a vehicle by the use of easily mountable and demountable mounting brackets. In addition, the sensor devices are capable of detecting the object in the path of a reversing vehicle, wireless signal transmitters, imbedded in the sensor devices, for sending signals representative of the distance of the object from the vehicle to a receiver, in the form of an mobile electronic device, e.g., a smart phone, an electronic tablet, etc. and a computer processing unit and software applications, also provided in the mobile electronic device, for processing the signals and producing an indicator, such as a visual display and/or readout indicative of the location of the object; additionally or alternatively, the indicator can an audio output to alert the driver of the object in the path of the reversing vehicle.

BRIEF DESCRIPTION OF THE DRAWINGS

The invention will now be described with reference to the following drawings in which:

FIG. 1 is a side view of a typical vehicle and towed object and sensor devices of the preferred embodiment of the invention;

FIG. 1*a* is an exploded detailed view of FIG. 1 showing details of a preferred embodiment of the invention;

FIG. 5 is a series of views of a sensor device according to the preferred embodiment of the invention;

FIG. 5a is a front view of a sensor device according to the preferred embodiment of the invention;

FIG. 5b is a side view of a sensor device according to the preferred embodiment of the invention;

FIG. 5c is a rear view of a sensor device according to the preferred embodiment of the invention;

FIG. 5d is a front view of a sensor device microcomputer transmitter processor and power source according to the preferred embodiment of the invention.

FIG. 5e is a side view of the sensor device microcomputer transmitter processor and power source of FIG. 5d.

FIG. 5f is a cross-sectional view of a sensor device of FIG. 5a provided with a sensor device microcomputer transmitter processor and power source according to the preferred embodiment of the invention.

FIG. 6 is a series of views of a sensor device according to another embodiment of the invention;

FIG. 7 is a series of views of a sensor device mounting bracket according to the preferred embodiment of the invention;

FIG. 7a is a front view of a sensor device mounting bracket according to the preferred embodiment of the invention;

FIG. 7b is a rear view of a sensor device mounting bracket according to the preferred embodiment of the invention;

FIG. 7c is a side view of a sensor mounting bracket according to the preferred embodiment of the invention;

FIG. 7d is a cut away side view of a sensor mounting bracket according to the preferred embodiment of the invention of FIG. 7c;

FIG. 8 is a series of views of a sensor device mounting bracket according to another embodiment of the invention;

FIG. 8a is a front view of a sensor device mounting bracket according to another embodiment of the invention;

FIG. 8b is a rear view of a sensor device mounting bracket according to another embodiment of the invention;

FIG. 8c is a side view of a sensor mounting bracket according to another embodiment of the invention;

FIG. 8d is a cut away side view of a sensor mounting bracket according to another embodiment of the invention of FIG. 8c;

FIG. 9 is a series of views of a sensor device mounting bracket according to another embodiment of the invention;

FIG. 10 is a series of views of a sensor device mounting bracket according to another embodiment of the invention;

FIG. 10b is a top view of a sensor device mounting bracket of FIG. 10a;

FIG. 10c is a side view of a sensor device mounting bracket of FIG. 10a;

FIG. 11 is a series of views of sensor devices of FIGS. 5 and 6 being mounted into the mounting bracket of FIG. 7;

FIG. 13 is a series of views of a typical vehicle and towed object, sensors, and mobile electronic device of an embodiment of the invention;

FIG. 13b is an exploded view of the interior cab section of the vehicle of FIG. 13a;

FIG. 13c is an exploded view of the rear section of the vehicle of FIG. 13a;

FIG. 14 is a series of views of a typical vehicle and towed object, sensors, and mobile electronic device of an embodiment of the invention;

FIG. 14a is a side view of a typical vehicle and towed object, sensors, and mobile electronic device of an embodiment of the invention;

FIG. 14b is an exploded view of the interior cab section of the vehicle of FIG. 14a;

FIG. 14c is an exploded view of the rear section of the vehicle of FIG. 14a.

DETAILED DESCRIPTION OF PREFERRED EMBODIMENTS

A preferred embodiment for use of the system of the invention is shown in FIG. 1.

In FIG. 1, a typical vehicle envisioned for use with the invention is shown, i.e., a semi-tractor trailer consisting of a tractor 10 and towed trailer 11 having a rear section 12. On the rear section 12 are located sensors devices 20, of the invention, which sensor devices, as is discussed in more detail in relation to subsequent Figures, are capable of sensing the proximity of objects behind tractor 10 and trailer 11. Sensor devices 20 can utilize a variety of methods of detection such as an ultrasound, electromagnetic, radiofrequency or similar methods as is discussed in more detail in relation to subsequent Figures.

Figure 3:
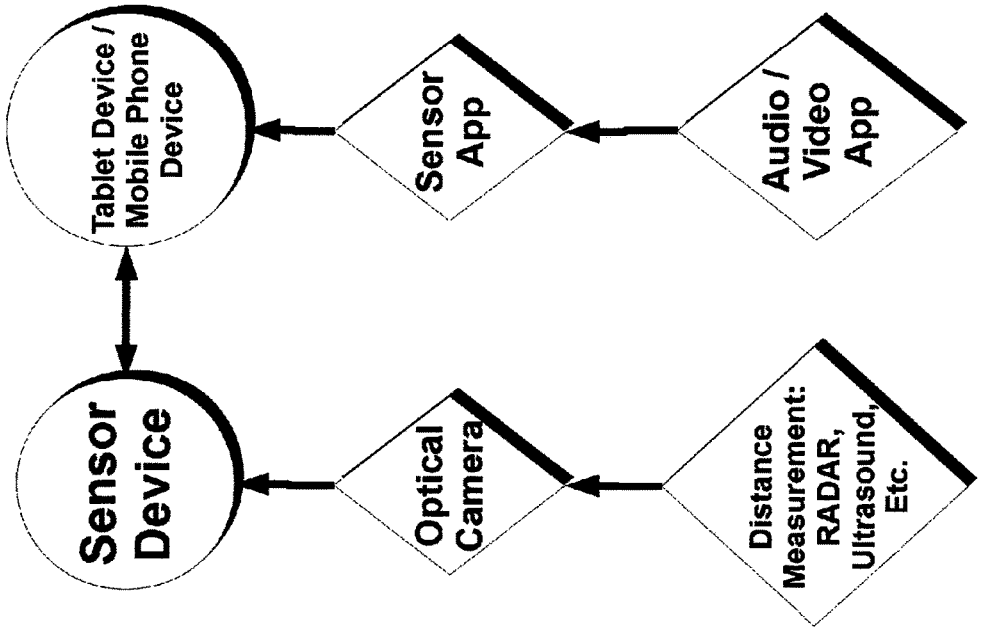
FIG. 3 is a concept flow diagram of the system according to the preferred embodiment of the invention.

Now referring to FIG. 1a, an exploded detailed side view of the rear section 12 of trailer 11 is seen showing particularly the placement and orientation of sensor device 20, sensor 21, further detailed and discussed in FIG. 3, on the tailgate 14 of rear section 12 of trailer 11. Sensor device 20 is shown mounted in a portable bracket 40, further shown and discussed in FIG. 5, which bracket is easily and readily mounted and demounted to tailgate member 14 attached to trailer rear section 12. Also seen in FIG. 1a, are sensor radiation waves 23, which can be as previously disclosed can be either ultrasound, electromagnetic, or similar detection waves.

Figure 2A:
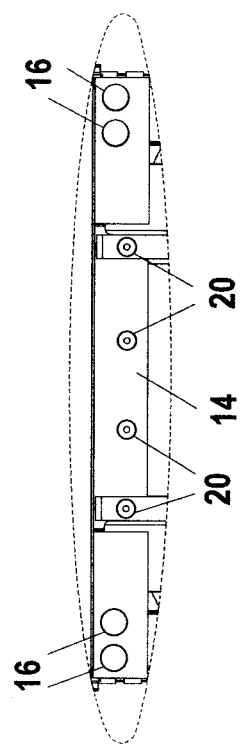
FIG. 2*a* is an exploded detailed view of FIG. 2 showing details of a preferred embodiment of the invention.
Figure 2:
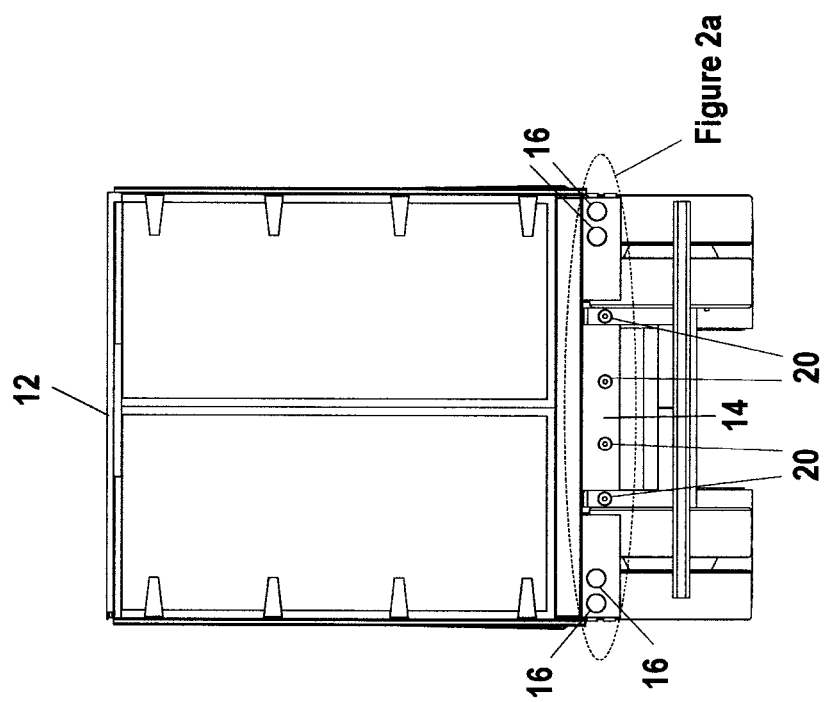
FIG. 2 is a rear view of the typical vehicle and towed object and sensor devices of the preferred embodiment of the invention.

In FIG. 2, the full rear section 12 of trailer 11, of FIG. 1, is shown along with the location and orientation of sensor devices 20 relative to the tail-lights 16 on the rear tailgate 14 of the trailer 11.

Now referring to FIG. 2a, an exploded detailed rear view of the rear section 12 of trailer 11 is shown particularly the placement and orientation of sensor devices 20 and taillights 16 on the tailgate 14 of rear section 12 of trailer 11. Although four sensor devices 20 are shown in FIG. 2b, with all sensor devices being located abreast of each other on tailgate 14, it is understood that sensor devices 20 can be located and orientated in any convenient and effective manner as desired by a driver of the vehicle.

Now referring to FIG. 3, a concept flow diagram of the system according to the preferred embodiment of the invention is shown. Particularly in FIG. 3, the overall operation of the preferred embodiment of the invention is disclosed wherein the sensor device, denoted by the encircled term device may comprise either an optical camera, a distance measurement device, a radar device, an ultrasound device, electromagnetic system or any other commonly available proximity sensor devices capable of sensing or detecting an object in the path of a reversing vehicle. For example, an ultrasonic detection device system can measure the distances to nearby objects via sensors located in the front and/or rear bumper fascias of vehicles. The ultrasonic sensor sends out or emit acoustic pulses or sound waves which can bound off of, reflect off of an object and return sound waves back to its sensor and with a control unit measuring the return interval of each reflected signal and calculating object distances and location of the object relative to the vehicle. The system, depending on its design, may then send a signal to a driver who can alter the path of the vehicle according. Similarly, an electromagnetic sensor system can send out, or emit, electromagnetic waves which can bound off of an object or reflect back to the sensor and produce a signal indicative of the distance to and location of the object relative to the sensor. As FIG. 3 furthers discloses, the system of the instant invention is provided with a sensor device capable of creating and transmitting electronic signals, via a wireless signal transmitter imbedded in the sensor device. Such transmitter can send the wireless signal by various systems, such as a technology that allows electronic devices to network, e. i., WI-FI, or a wireless technology standard for exchanging data over short distances commonly known as Bluetooth, or ZigBee, etc. The wireless signals are transmittable to a mobile electronic appliance, such as a smart phone, or an electronic tablet. The mobile electronic appliance is capable of sending, receiving, and processing the wireless signals and/or data and also is compatible with the Android mobile operating system, the Iphone cellular phone mobile operating system, i.e., Ios, and other commercially available mobile device operating systems. Additionally, the sensor device of the invention incorporates radiofrequency microchip technology, in the form of a microcomputer transmitter processor capable of sending, receiving, processing, and transmitting data and/or signals to and from navigational positioning systems, such as the Global Positioning System, i.e., GPS, or Global Navigational Satellite System, i.e., the GLONASS. Additionally, the sensor device is capable of creating a signal and/or data which can be transmitted to a satellite navigational technology system, i.e., GPS or GLONASS, for geographically locating the sensor devices which signals and/or data can transmit signals and/or data to the mobile electronic appliance. As is further shown in FIG. 3, the mobile electronic appliance is provided with or is accessible to computer processing application software, i.e., otherwise known as an app, which app is capable of processing the any signal and/or data receiving by the sensor device. Finally, the electronic appliance of the instant application is further provided with application software capable producing a indicator, for the driver, such as a visual display, readout and/or an audio signal of any object detected in the path of the reversing vehicle and showing the relative location of any object to the rear of the vehicle. The display, readout or audio signal then allows the driver to alter the course of the reversing vehicle to avoid the object when using the system as a reversing assistant.

Figure 4:
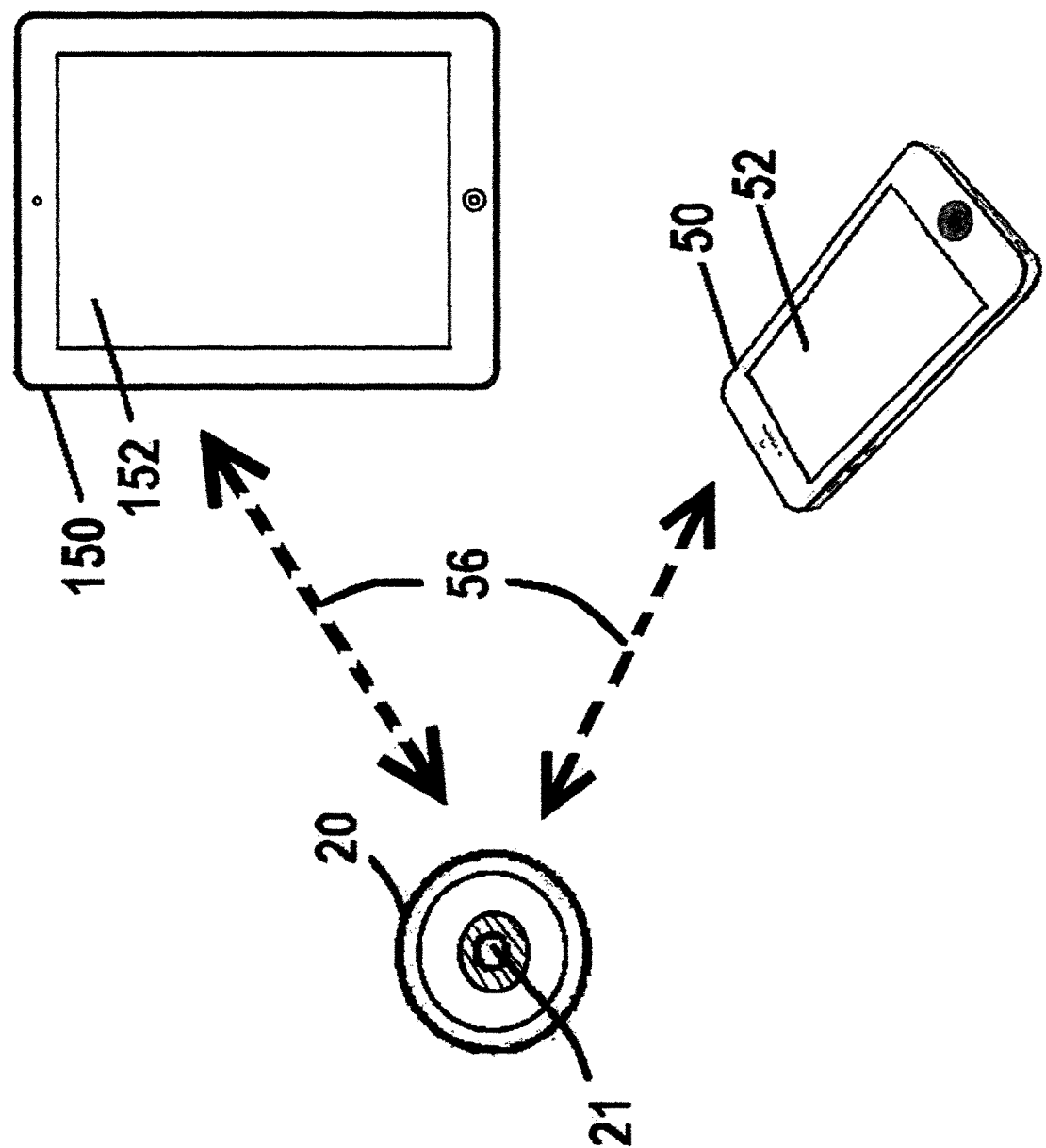
FIG. 4 is a concept diagram of the system according to the preferred embodiment of the invention.

FIG. 4 is a concept system diagram according to the preferred embodiment of the invention particularly showing the wireless nature of the instant invention system. Particularly, FIG. 4 shows that sensor device 20 having sensor 21, is capable of transmitting a wireless signal 56 to an mobile electronic appliance, either a smart phone 50 or mobile electronic tablet 150. Smart phone 50 is shown with display 52 on which a visual display or readout of the sensed proximity area and any potential obstacle objects is provided for the driver. Also shown in FIG. 4 is electronic tablet 150 with visual display 152 which is capable of wirelessly communicating with sensor device 20. As previously disclose, smart phone 50 and electronic tablet 152 are compatible with the Android mobile operating system, the Iphone cellular phone mobile operating system, i.e., Ios, and other commercially available mobile device operating systems. As is further discussed in FIG. 5, sensor device 20 incorporates a programmed microcomputer transmitter processor, i.e., a microchip, allowing sensor 20 to wirelessly communicate with the electronic appliance. In an alterative embodiment, as disclosed in reference to FIG. 14, the microcomputer transmitter processor is further capable of receiving and transmitting signals from a satellite navigation system, e.g., GPS. as previously discussed. Additionally, processor 60 is provided with its own power source, e.g., a battery 70; alternatively processor 60 can be constructed to be powered by electromagnetic energy provided by the receiving signal from the satellite navigation system. Processor 60 and is further able to transmit an object detection signal, received from sensor 20, to the electronic tablet or phone either by WI-FI, Bluetooth, ZigBee, or thru the GPS technology. Finally, as previously discussed in reference to FIG. 3 the mobile electronic appliance, be it smart phone 50 or electronic tablet 152, is capable of producing an indicator, visual display or readout, 152 on the tablet, or 52 on the smart phone, showing the relative location of an object from the rear of the vehicle to allow the vehicle driver to determine adjust or maneuver the vehicle about or around any object or obstacles in the path of the reversing vehicle.

Now referring to FIG. 5, a series of views of a sensor device according to the preferred embodiment of the invention are shown.

In particular, in FIG. 5a, sensor device 20 is shown to be of a circular disc shape having a sensor 21 centrally located. Sensor 21 is capable of, as previously disclosed, of transmitting electromagnetic, microwave, or ultrasonic signals outwardly and further capable of receiving return or reflected electromagnetic, microwave, or ultrasonic signals from obstacles or objects in the field of view of the sensor device. Additionally, sensor device 20 is provided with a microcomputer transmitter processor, i.e., a microchip, capable of creating an electronic indicator of these obstacle or object signals as previously discussed.

FIG. 5b is a side view of a sensor device 20 having sensor 21 with backing 25 and rubberized coating 27 allowing the sensor device to be functional in in-climate weather.

FIG. 5c is a rear view of a sensor device 20 having rubberized coating 27.

FIG. 5d is a front view of a sensor device microcomputer transmitter processor 60 and power source 70, before installation in sensor device 20 according to the preferred embodiment of the invention. In addition to being able to creating an electronic indicator of obstacle or object signals, sensor device microcomputer transmitter processor 60 is capable of communicating wirelessly with a global satellite system, e.g., GPS, for determining the geographic location of the sensor device 20. Processor 60 is also capable of wirelessly communicating the location of the sensor 20 with the electronic appliance as previously discussed, in reference to FIGS. 3 and 4. Further, processor 60 is powered by an electrical power source in the form of battery 70; alternatively processor 60 can be constructed to be powered by electromagnetic energy provided by the receiving signal from the satellite navigation system.

FIG. 5e is a side view of the sensor device microcomputer transmitter processor 60 and power source 70 of FIG. 3d and reveals the relative thinness of these components.

FIG. 5f is a cross-sectional view of a sensor device of FIG. 5a revealing the location a sensor device microcomputer transmitter processor 60 and power source 70 within sensor 20 according to the preferred embodiment of the invention. All of the components, the sensor device 21, processor 60 and power source 70 are suitable electronically connected, un-shown in the figures.

Now referring to FIG. 6, a series of views of a sensor device are shown according to another embodiment of the invention.

Figure 6B:
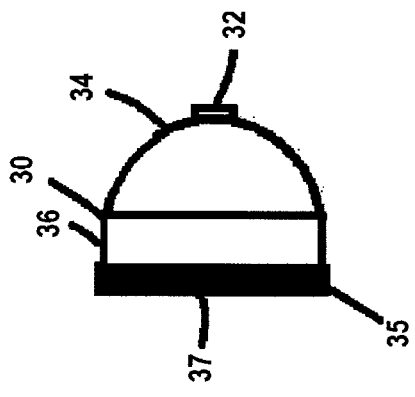
FIG. 6b is a side view of a sensor device according to another embodiment of the invention.
Figure 6D:
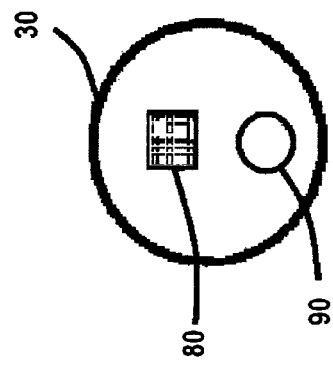
FIG. 6d is a cross-sectional view of a sensor device of FIG. 6a provided with a sensor device microcomputer transmitter processor and power source according to another embodiment of the invention.
Figure 6A:
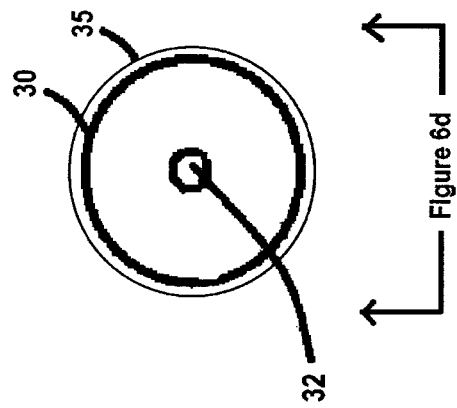
FIG. 6a is a front view of a sensor device according to another embodiment of the invention.

As can be seen from FIG. 6a, a front view of sensor device 30 comprises a typical type sensor, e.g., an ultrasonic type proximity sensor, having a circular shape with a sensor 32 located at its center. Also shown in FIG. 6a is outer annular ridge member 35.

FIG. 6b is a side view of sensor device 30 showing the location of sensor 32, the semi-circular body 34, annular ridge member 35, and rubberized coating 37.

Figure 6C:
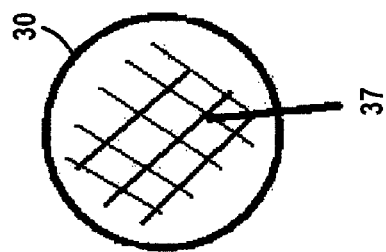
FIG. 6c is a rear view of a sensor device according to another embodiment of the invention.

FIG. 6c is a rear view of a sensor device 30 having rubberized coating 37 similar to the coating 27 of sensor device 20 of FIG. 5.

FIG. 6d is a cross-sectional view of the sensor device of FIG. 6a provided with a sensor device microcomputer transmitter processor 80 and power source 90. Processor 80 and power source 90 function with sensor device 30 similar to the functionality of to sensor device microcomputer transmitter processor 60 and power source 70 to sensor device 20 of FIG. 5, i.e. processor 80 is capable of wirelessly communicating the location of the sensor 30 with the electronic appliance as previously discussed, in reference to FIGS. 3 and 4, creating an electronic indicator of obstacle or object signals in the path of a reversing vehicle and communicating wirelessly with a global satellite system, e.g., GPS, for determining the geographic location of the sensor device 30. Alternatively processor 80 can be constructed to be powered by electromagnetic energy provided by the receiving signal from the satellite navigation system. Similar to the construction of sensor device 20, the processor 80 and power source 90 are suitable electronically connected for functionally, un-shown in the figures.

Now referring to FIG. 7, a series of views of a sensor device mounting bracket according to the preferred embodiment of the invention is shown.

Particularly, in FIG. 7a, a front view of sensor device mounting bracket 40 is shown which of similar circular shape and sized to allow sensor device 20 or 30 to be mounted upon and secured to sensor device bracket 40. Sensor device mounting bracket 40, is constructed to be easily mountable or demountable to a vehicle, and thereby is portable. Mounting bracket 40 is also provided with annular portion 43 and mounting depression 44. Further, sensor device mounting bracket 40 may be provided with mounting eyes 42 to allow the bracket to be mounted on a vehicle.

In FIG. 7b, a rear view of sensor device mounting bracket 40 is shown revealing the location of mounting eyes 42 and that bracket 40 is further provide with rubberized backing 46.

FIG. 7c reveals mounting depression 44, in phantom lines, which is similar to the circular shape and sized to allow sensor device 20 or 30 to be mounted and be secured therein. Additionally, FIG. 7c, a side view of FIG. 7a, reveals the rubberized backing 46 on bracket 40 allowing the bracket to be functional in in-climate weather. Also shown in FIG. 7c, in phantom lines, are mounting eyes 42 and annular portion 43.

FIG. 7d is a cross-sectional view of FIG. 7c showing the relationship of mounting depression 44 to annular portion 43, mounting eyes 42, and rubberized backing 46 of bracket 40. Mounting bracket 40 is constructed to be placed and secured to the vehicle anticipated for use with the invention, typically on tailgate 14 of trailer 11 of FIGS. 1, 1a, 2 and 2a. Mounting eyes 42 allow for mounting bracket 40 to be mounted and/or secured to the vehicle by suitable screws, un-shown, typically on tailgate 14 of trailer 11 of FIGS. 1, 1a, 2 and 2a.

Now referring to FIG. 8 a series of views of a sensor device mounting bracket according to another embodiment of the invention is shown.

In particular, in FIG. 8a, a front view of sensor device bracket 140 reveals that sensor device bracket 140, is constructed to be easily mountable or demountable to a vehicle, and is thereby portable and is of similar circular shape and sized to allow sensor device 20 or 30 to be mounted therein and secured to sensor device bracket 140. Also bracket 140, as seen in FIG. 8a, is provided with an annular portion 143.

In FIG. 8b, a rear view of sensor device bracket 140 reveals bracket 140 being provided with mounting annular circular magnet 142 to allow bracket 140 to be mounted on a vehicle; also shown in FIG. 8b, is the rubberized backing 146 on bracket 140 allowing the bracket to be functional in in-climate weather.

FIG. 8c, a side view of FIG. 8a, reveals mounting depression 144, in phantom lines, which is similar to the circular shape and sized to allow sensor device 20 or 30 to be mounted and be secured therein and additionally, FIG. 8c reveals annular portion 143. Also shown in FIG. 8c is mounting annular circular magnet 142.

FIG. 8d is a cross-sectional view of FIG. 8c showing the relationship of mounting depression 144 to annular portion 143, mounting annular magnet 142 of bracket 140. Mounting bracket 140 is constructed to be placed and secured to the vehicle anticipated for use with the invention, typically on tailgate 14 of trailer 11 of FIGS. 1, 1a, 2 and 2a.

Now referring to FIG. 9, a series of views of a sensor device mounting bracket according to another embodiment of the invention is shown.

Figure 9A:
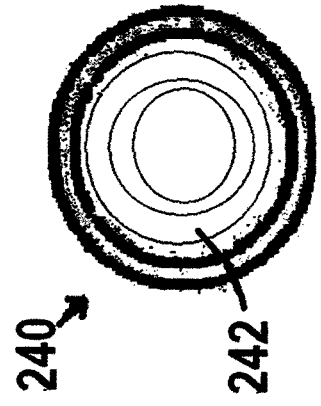
FIG. 9a is a front view of a sensor device mounting bracket according to another embodiment of the invention.

In particular, in FIG. 9a, a front view of sensor device bracket 240 reveals that sensor device bracket 240 is constructed to be easily mountable or demountable to a vehicle, and thereby is portable, and is of similar circular shape and sized to allow sensor device 20 or 30 to be mounted upon and secured to sensor device bracket 240. Also bracket 240, as seen in FIG. 9a, is provided with an annular portion 243 and mounting depression 244.

Figure 9B:
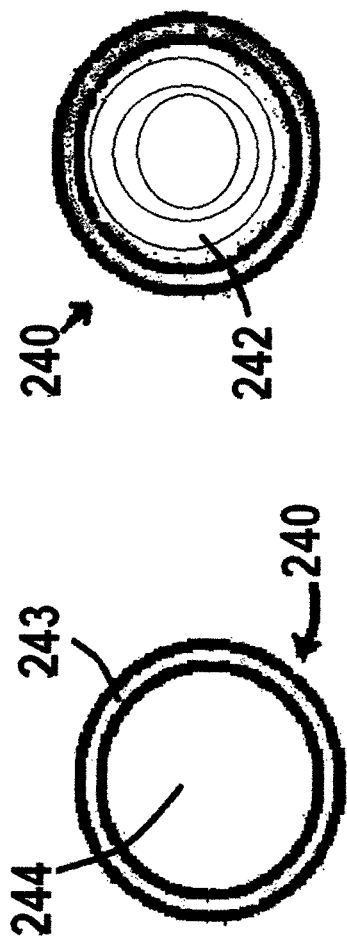
FIG. 9b is a rear view of a sensor device mounting bracket according to another embodiment of the invention.

In FIG. 9b, a rear view of sensor device bracket 240 reveals bracket 240 being provided with mounting circular suction cup 242 to allow bracket 240 to be mounted and/or secured on a vehicle.

Figure 9C:
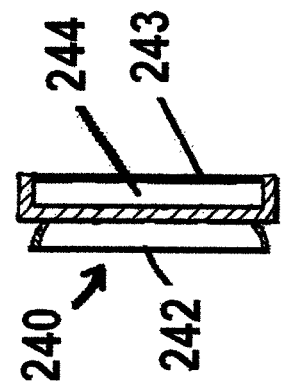
FIG. 9c is a side view of a sensor mounting bracket according to another embodiment of the invention.

FIG. 9c, a side view of FIG. 9a, reveals mounting depression 244 which is similar to the circular shape and sized to allow sensor device 20 or 30 to be mounted and be secured therein. Additionally, FIG. 9c reveals annular portion 243 and mounting circular suction cup 242.

Figure 9D:
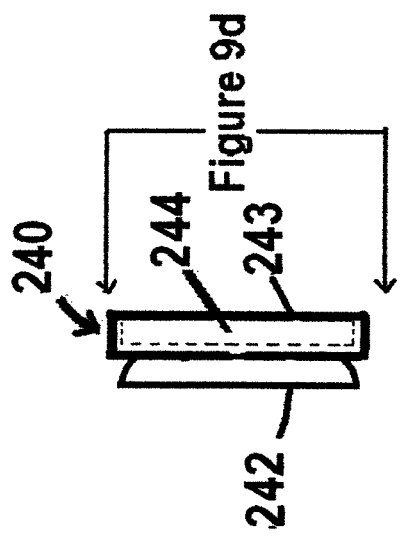
FIG. 9d is a cut away side view of a sensor mounting bracket according to another embodiment of the invention of FIG. 9c.

FIG. 9d is a cross-sectional view of FIG. 9c showing the relationship of mounting depression 244 to annular portion 243 and mounting circular suction cup 242 of bracket 240. Mounting bracket 240 is constructed to be placed and secured to the vehicle anticipated for use with the invention, typically on tailgate 14 of trailer 11 of FIGS. 1, 1a, 2 and 2a.

Now referring to FIG. 10, a series of views of a sensor device mounting bracket according to another embodiment of the invention is shown.

Figure 10A:
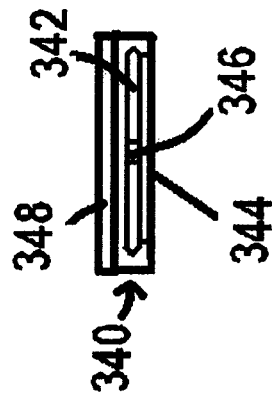
FIG. 10a is a front view of a sensor device mounting bracket according to another embodiment of the invention.

In particular, FIG. 10a is a front view of a sensor mounting bracket 340, which is constructed to be easily mountable or demountable to a vehicle, i.e., portable. Additionally FIG. 10a further shows the groove 342 sized to receive either sensor device 20 or annular ridge member 35 of sensor device 30, open portion 344 and moisture weep hole 346.

Figure 10B:
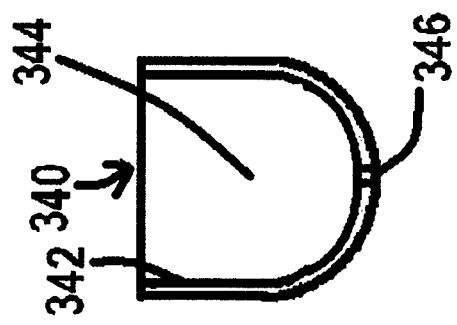

FIG. 10b is a top view of a sensor mounting bracket 340 showing the groove 342 sized to receive sensor device 20 or annual ridge member 35 of sensor device 30, open portion 344 and moisture weep hole 346 and open portion 344. Also shown in FIG. 10b, is backing 348, which can secure bracket 340 to a vehicle and may comprise as previously disclosed magnets, here in a U-shaped configuration, as viewed from the front, or by other means such as for e.g. suction cup devices as discussed in FIG. 9.

Figure 10C:
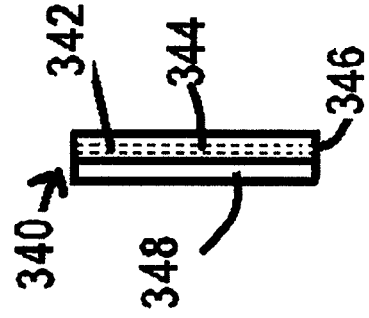

FIG. 10c is a side view of a sensor device mounting bracket 340 showing groove 342, open portion 344, and weep hole 346, in phantom lines, and backing 348. Mounting bracket 340 is constructed to be placed and secured to the vehicle anticipated for use with the invention, typically on tailgate 14 of trailer 11 of FIGS. 1, 1a, 2 and 2a.

Figure 10D:
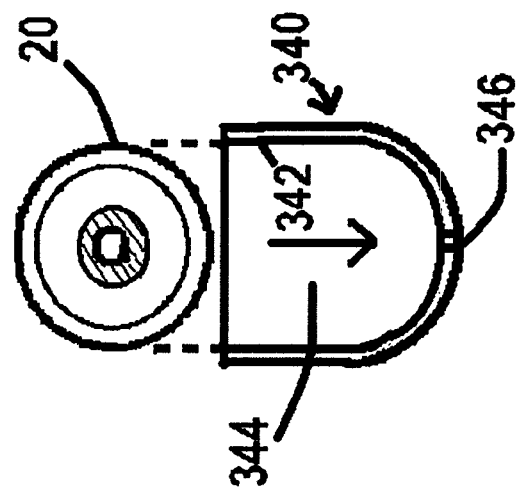
FIG. 10d is a front view of a sensor mounting bracket of FIG. 10a showing the assembly of a sensor device with the bracket.

Finally, FIG. 10d is a front view of sensor mounting bracket 340, similar to the front view of FIG. 10a, and shows sensor device 20 being mounted within sensor mounting bracket 340 by sliding sensor device 20 vertically along groove 342 to rest on the bottom of sensor mounting bracket 340. Once a sensor device is mounted into mounting bracket 340, the entire assembly is assembled to the rear tailgate 14 of trailer 11 and although the previous disclosure has the sensor device being assembled with mounting bracket 340 first, the instant invention would allow for the assembly of the mounting bracket to be assembled to the rear tailgate 14 firstly and then have the sensor device assembled to the mounting bracket. Sensor device 30 is also configured to mount in mounting bracket 340.

Now referring to FIG. 11, a series of views showing how the various mounting brackets of FIG. 7 to FIG. 9 are able to mount and secure sensor devices 20 or 30 are presented.

Figure 11C:
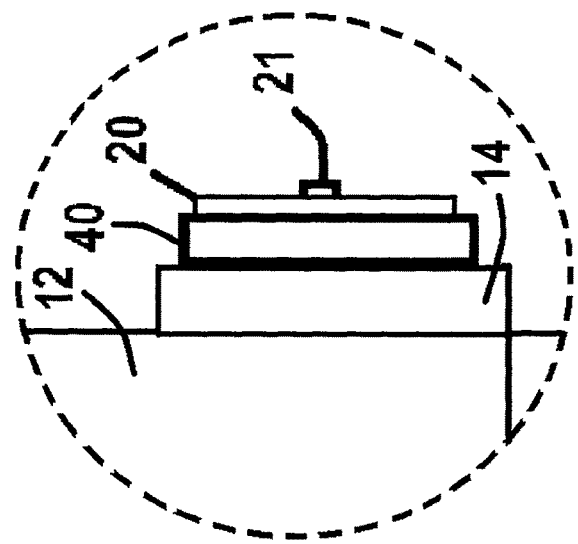
FIG. 11c is a side exploded view of the mounted sensor device of FIG. 11a being assembled with the rear section of the vehicle of FIG. 1.
Figure 11A:
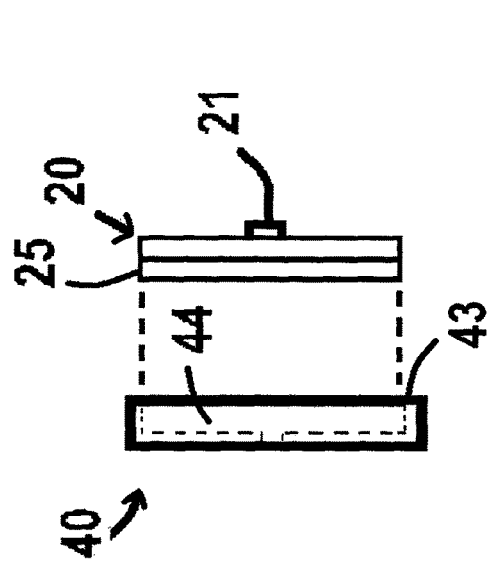
FIG. 11a is a side view of a sensor device of FIG. 5 being mounted into the mounting bracket of FIG. 7.

Particularly, FIG. 11a is a side view of a sensor device 20, with sensor 21 and backing 25, of FIG. 5, being horizontally mounted into the mounting bracket 40 of FIG. 7 and as can be seen from FIG. 11a, sensor device 20, which is of the same circular shape and sized to fit bracket 40, can be secured into mounting bracket 40 depression 44, by friction fitting, by positioning and pressing sensor device 20 into mounting bracket 40. The assembled mounting bracket 40 and sensor device 20 can then be assembled to the rear tailgate 14 of trailer 11

Figure 11B:
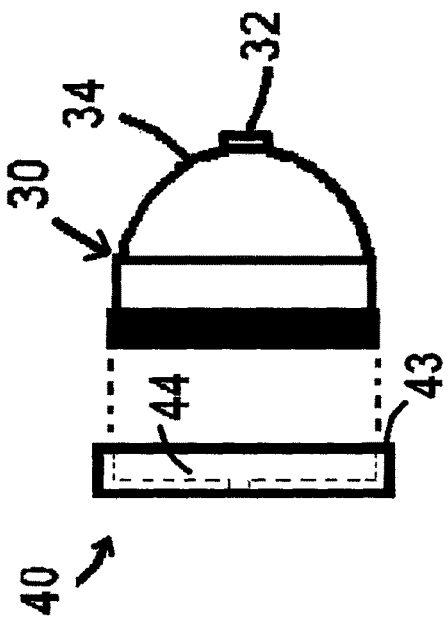
FIG. 11b is a side view of a sensor device of FIG. 6 being mounted into the mounting bracket of FIG. 5.

FIG. 11b is a side view of a sensor device 30, with sensor 32, with semi-circular body 34 of FIG. 6, and shows how sensor device 30 is being horizontally mounted into the mounting bracket depression 44, of mounting bracket 40 of FIG. 7 in a similar fashion to the mounting of sensor 20 previously shown in FIG. 11a.

Once assembled, sensor device 30 and mounting bracket 40 can be assembled to the rear tailgate 14 of trailer 11 similar to the assembly shown in FIG. 11c for sensor device 20, with sensor 21, and mounting bracket 40. In a similar fashion, either sensor device 20 or sensor device 30 can be mounted into mounting brackets 140, or 240 of FIGS. 8 and 9 as previously disclosed for mounting bracket 40. Additionally, once either sensor device 20 or 30 is assembled to either mounting brackets 140, or 240, the assembled sensor device and mounting bracket can be assembled to the rear tailgate 14 of trailer 11, of FIGS. 1 and 2, as previously disclosed for assembled sensor device 20 or 30 with mounting bracket 40. Finally, although it is intended that sensor devices 20 or 30 be assembled with the mounting bracket first and secondly the entire assembly to the rear tailgate 14 of the trailer 11, the instant invention would allow for the assembly of the mounting bracket to be assembled to the rear tailgate 14 firstly and then have the sensor device assembled to the mounting bracket.

Figure 12:
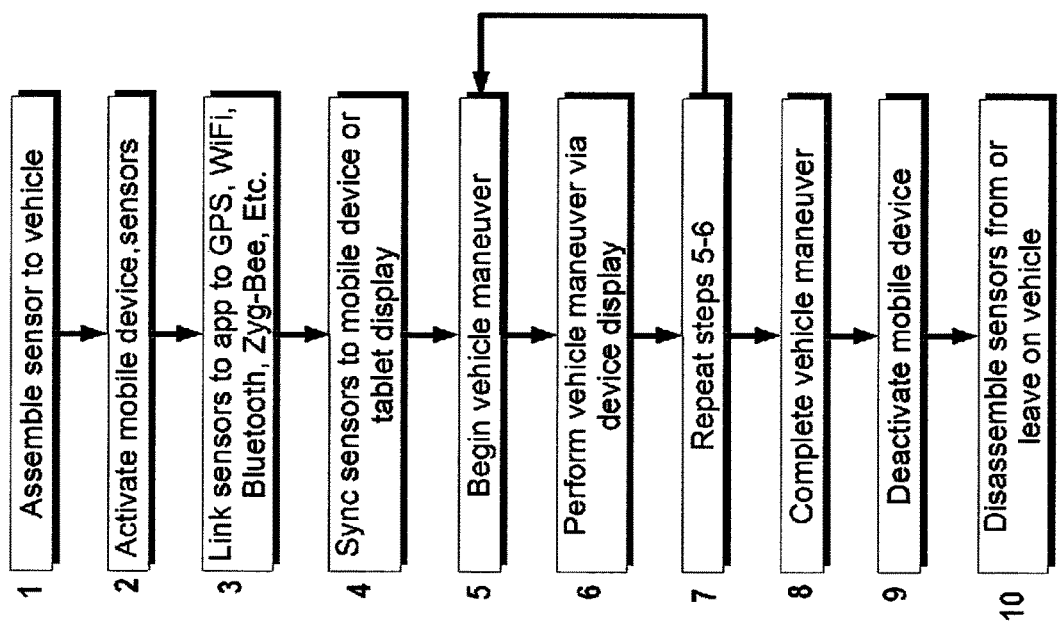
FIG. 12 is a step by step loop feedback flow chart of operating the system according to the preferred embodiment of the invention.

FIG. 12 is a step by step flow chart of the system operation according to the preferred embodiment of the invention and shows the various steps required by a vehicle driver to utilize the system of the instant invention. Particularly, the initial step requires that the driver assemble or mount the sensor device(s) to the desired vehicle, e.g. sensor device 20 and mounting bracket 40, on the rear section of the vehicle, usually on a tailgate, such that the sensor device(s) are allowed to emit signals to the rear of the vehicle for detecting any object in the rearward path of the vehicle. Then, the driver activates the mobile device and the sensor device and links the sensor device 20 via an internal software computer application programmed in smart phone 50 to a sensor device to mobile device connection system, e.g, a GPS, WI-FI, Blue Tooth, or ZigBee system, etc. The sensor device 20 emits a signal to the rear of the vehicle and receives and processes any return signal for detecting any rearward path objects. The driver/user then synchronizes the sensor device 20, and smart phone 50 device to produce a visual and/or audible display, on smart phone 50, showing the orientation of the vehicle to any detected objects in the rearward path of the vehicle, usually through a computer software application, e.g., an app, programmed into, imbedded, and operational within the mobile device. The driver/user then performs a rearward maneuver of the vehicle using the visual and/or audible display to avoid any detected objects. If necessary, the driver/user may repeat the above steps to complete the rearward maneuver and upon completion of the maneuver, the driver/user de-activates sensor device 20 and smart phone 50, mobile device and disassembles the sensor device(s) from the vehicle. Although the above example details the use of sensor device 20 and mounting bracket 40, sensor device 30 can be used in the same manner, in the above operational steps of FIG. 12, and can be mounted into mounting brackets 140, or 240 of FIGS. 8 and 9 as previously disclosed for mounting bracket 40.

Additionally, once either sensor device 20 or 30 is assembled to either mounting brackets 140, or 240, the assembled sensor device and mounting bracket can be assembled, and disassembled, to the rear tailgate 14 of trailer 11, of FIGS. 1 and 2, as previously disclosed for assembled sensor device 20 or 30 with mounting bracket 40.

Now referring to FIG. 13, a series of views of a typical vehicle and towed object, sensors, and mobile electronic device of an embodiment of the invention is shown.

Figure 13A:
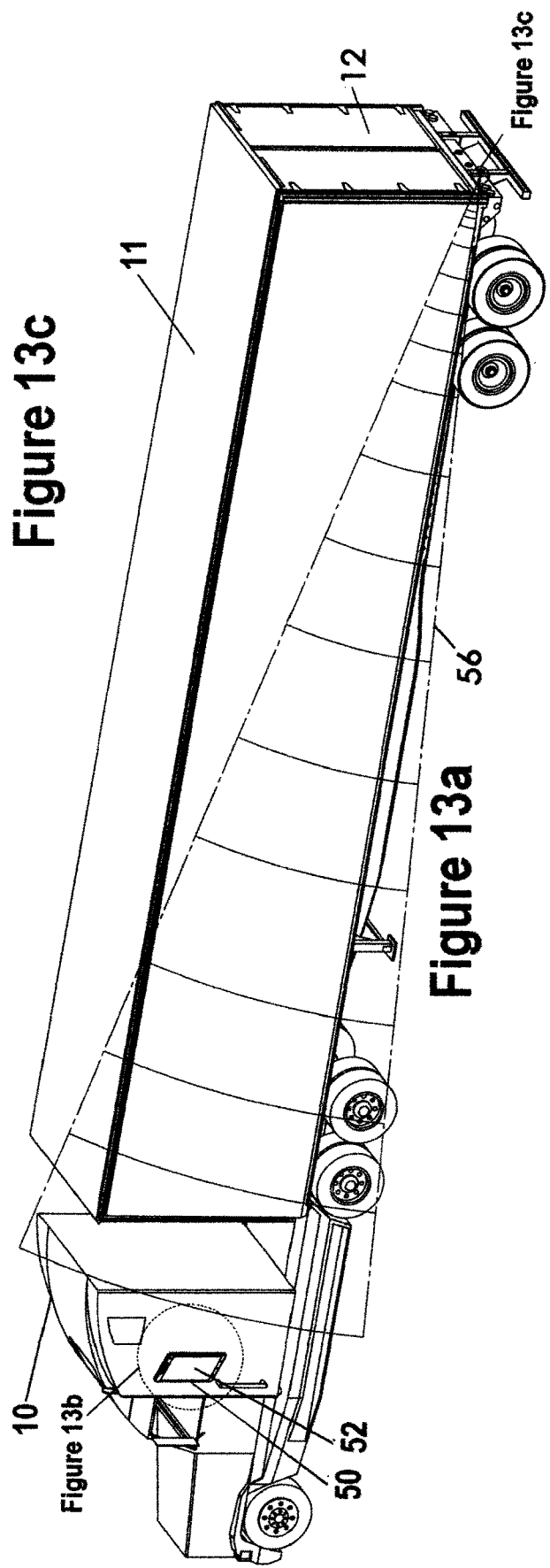
FIG. 13a is a side view of a typical vehicle and towed object, sensors, and mobile electronic device of an embodiment of the invention.

Particularly, in FIG. 13*a*, perspective view, is a typical vehicle envisioned for use with the invention is shown, a semi-tractor trailer consisting of a tractor 10 and towed trailer 11 having a rear section 12. And also, as previously disclosed, on the rear section 12 are located device sensors 20, for example, which sensors are capable of sensing the proximity of objects behind tractor 10 and trailer 11. Sensor device 20, is further provided with a sensor device microcomputer transmitter processor, as previously described, is capable of sending a signal 56, via a WI-FI, Blue Tooth, or ZigBee, etc., device, to mobile electronic device, here a smart phone 50. Smart phone 50, as previously described, is provided with be provided with or be accessible to a computer application software i.e., otherwise known as an app, which app is capable of processing the sensor device signal and producing a driver visual display, readout and/or audio signal 52 of the object detection.

Figure 13C:
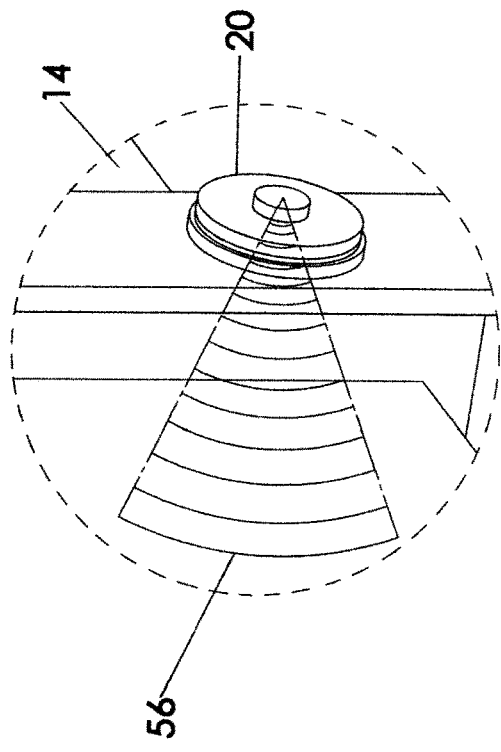
Figure 13B:
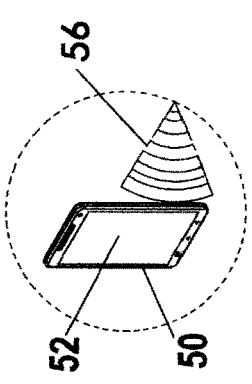

FIG. 13*b* is an exploded detailed view of the tractor section of the vehicle 11 of FIG. 13*a* and shows the approximate location of cellular phone 50 receiving signal 56 for processing thereof and producing visual display, readout and/or audio signal 52 of the object detection. Further, FIG. 13*b* discloses two-way nature of signal 56, i.e., that cellular phone is capable of transmitting a signal to sensor device 20, e.g., for activation, etc.

FIG. 13*c* is an exploded detailed view of the rear section of the vehicle 11 of FIG. 13*a* and shows the orientation of sensor device 20 to the rear section 14 and the projected path of a signal 56 to the front of vehicle 11 to tractor 10. As previously disclosed, although smart phone 50, visual display, readout and/or audio signal 52, and sensor device 20 are shown as examples for use, sensor device 30, electronic tablet 150, and visual display, readout and/or audio signal 152 can be substituted therefore and sensor devices 20 and 30 are constructed to be interchangeable with both smart phone 50 and electronic tablet 152, Now referring to FIG. 14, a series of views of a typical vehicle and towed object, sensors, and mobile electronic device of an embodiment of the invention is shown.

Particularly, in FIG. 14*a*, as previously disclosed, a typical vehicle in envisioned for use with the invention is shown, in perspective view, a semi-tractor trailer consisting of a tractor 10 and towed trailer 11 having a rear section 12. And also, as previously disclosed, on the rear section 12 are located device sensors 20 which sensors are capable of sensing the proximity of objects behind tractor 10 and trailer 11. Sensor device 20, is further provided with a sensor device microcomputer transmitter processor 60, as previously described, is capable of sending a signal 58, via a GPS, GLONASS, or similar system to a satellite 59 and which is signal is relayed to mobile electronic device, here a smart phone 50. Smart phone 50, as previously described, is provided with be provided with or be accessible to a computer application software capable of processing the sensor device signal 58 and producing a driver visual display, readout and/or audio signal 52 of the object detection.

FIG. 14*b* is an exploded detailed view of the tractor section of the vehicle 11 of FIG. 14*a* and shows the approximate location of smart phone 50 receiving signal 58 for processing software, within smart phone and capable producing a visual display, readout and/or audio signal 52. Further FIG. 14*b* discloses two-way nature of signal 58, i.e., that smart phone 50 is capable of transmitting a signal to sensor device 20, e.g., for activation, processing, etc.

FIG. 14*c* is an exploded detailed view of the rear section of the vehicle 11 of FIG. 14*a* and shows the orientation of sensor device 20 to the rear section 14 and the projected path of a signal 58 to the satellite 59 and then to tractor 10 and smart phone 50. As previously disclosed, although smart 50, with its embedded computer application software, capable producing a visual display, readout and/or audio signal 52 and sensor device 20 are shown as examples for use, sensor device 30, electronic tablet 150, and computer application software, capable producing a visual display, readout and/or audio signal 152 can be substituted therefore and sensor devices 20 and 30 are constructed to be interchangeable with both smart phone 50 and electronic tablet 150.

Having now described that various details and operations of the various components of the wireless sensor devices, portable or detachable from either motorized or un-motorized vehicle, connected via a mobile smart phone or electronic tablet, its typical use with now discussed. Firstly the driver assembles or mounts the sensor device(s) to the desired vehicle, either, sensor device 20 or 30, using any of the brackets bracket 40, 140, 240 or 340 on the rear section of the vehicle, usually on a tailgate, such that the sensor device(s) are allowed to emit signals to the rear of the vehicle for detecting any object in the rearward path of the vehicle. Secondly, driver activates the mobile electronic device, either smart phone 50 or electronic tablet 150, linking and activating the sensor devices 20 or 30 via an internal software computer application programmed in the mobile electronic device and signals sent to the sensor devices either by a GPS, a WI-FI, a Blue Tooth, or ZigBee, etc., or similar system. The sensor devices 30 emits a signal to the rear of the vehicle and receives and processes any return signal for detecting any rearward path objects and sends a processed signal 56 to the mobile electronic device creating a visual and/or audible display, on the mobile electronic device showing the orientation of the vehicle to any detected objects in the rearward path of the vehicle. The driver then performs a rearward maneuver of the vehicle using the visual and/or audible display to avoid any detected objects and if necessary, the driver may repeat the above steps to complete the rearward maneuver. Upon completion of the maneuver, the driver de-activates the sensor devices and electronic mobile and disassembles the sensor device(s) from the vehicle.

The principles of the invention could be practiced by those of skilled in the art with equivalent alternative constructions. The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

When introducing elements of the present invention or the preferred embodiment(s) thereof, the articles "a", "an", "the", and "said" are intended to mean there are one or more of the elements. The terms "comprising", "including", and "having" are intended to be inclusive and mean that there may be additional elements other than the listed elements.

The preceding written description and the accompanying drawings are intended solely as representative examples. Only the appended claims and their equivalents define the scope of the protected invention. The invention described herein is susceptible to variations, modifications and/or additions other than those specifically described and it is to be understood that the invention includes all such variations, modifications and/or additions which fall within the spirit and scope of the following claims.

The invention claimed is:

1. A system for aiding in the reversing of a vehicle the system comprising:
    a sensor device capable of sensing an object in a path to the rear of said vehicle wherein the sensor device is a proximity sensor in the form of an ultrasonic sensor capable of sending out sound waves which can impact and reflect off of said object and wherein said ultrasonic sensor can reflect sound waves back to the sensor device such that said sensor device can then determine the distance and location of said sensor device relative to said and wherein said sensor device produces a signal representing said distance and location and wherein
    said sensor device is provided with a local area networking computer microcomputer transmitter processor communicating with a mobile electronic appliance in the form of a smart phone and wherein said smart phone is provided with computer application software which processes said signal representing said distance and location from said ultrasonic sensor to said object to thereby produce a visual display on the smart phone which visual display shows the location of the object and wherein the computer application software produces an audio output of the location of the object and wherein said sensor device is provided with a power source in the form of a battery and wherein said sensor device is provided with rubber backing and wherein
    said sensor device is attachable and detachable from said vehicle by a portable mounting bracket comprising a U-shaped configuration having a semi-circular shape on a bottom portion and an open portion on a top portion and wherein portable mounting bracket is provided with an internal groove and a moisture weep hole on a bottom portion of said mounting bracket wherein said sensor device is insert able from said top of mounting bracket vertically to move downwardly along the internal groove wherein said sensor device rests on said bottom of said portable mounting bracket and wherein said portable mounting bracket is provided with a magnetic fastener having a U-shaped configuration allowing said portable mounting bracket to be attachable and detachable to said rear of said vehicle and wherein said portable mounting bracket is constructed to cooperate with and receive said sensor device and wherein said portable mounting bracket is attachable and detachable to said rear of said vehicle to thereby aide a driver of said vehicle to maneuver said vehicle in a rearward direction and avoid said object in said path of said vehicle.

2. A system for aiding in the reversing, of a vehicle the system comprising:
    a sensor device capable of sensing an object in a path to the rear of said vehicle wherein the sensor device is a proximity sensor in the form of an electromagnetic sensor capable of sending out electromagnetic waves which can impact and reflect off of said object and return electromagnetic waves back to said electromagnetic sensor such that said sensor device can then determine the distance and location of said sensor device relative to said object and wherein said sensor device produces a signal representing said distance and location and wherein
    said sensor device is provided with a local area networking computer microcomputer transmitter processor communicating with a mobile electronic appliance in the form of a smart phone and wherein said smart phone is provided with computer application software which processes said signal representing said distance and location from said sensor device to said object to thereby produce a visual display on the smart phone which visual display shows the location of the object and wherein the computer application software produces an audio output of the location of the object and wherein said sensor device is provided with a power source in the form of a battery and wherein said sensor device is provided with rubber backing and wherein
    said sensor device is attachable and detachable from said vehicle by a portable mounting bracket comprising a U-shaped configuration having a semi-circular shape on a bottom portion and an open portion on a top portion and wherein portable mounting bracket is provided with an internal groove and a moisture weep hole on a bottom portion of said mounting bracket wherein said sensor device is insert able from said top of mounting bracket vertically to move downwardly along the internal groove wherein said sensor device rests on said bottom of said portable mounting bracket and wherein said portable mounting bracket is provided with a magnetic fastener having a U-shaped configuration allowing said portable mounting bracket to be attachable and detachable to said rear of said vehicle and wherein said portable mounting bracket is constructed to cooperate with and receive said sensor device and wherein said portable mounting bracket is attachable and detachable to said rear of said vehicle to thereby aide a driver of said vehicle to maneuver said vehicle in a rearward direction and avoid said object in said path of said vehicle.

3. A system for aiding in the reversing of a vehicle the system comprising:
    at least one sensor device capable of sensing and object in a path to the rear of said vehicle wherein the sensor device is a proximity sensor which can determine the distance and location of said sensor device relative to said object in said path and wherein
    the sensor device produces a signal representing said distance and location, and wherein
    the sensor device is provided with means for communicating with a mobile electronic appliance which processes said signal representing said distance and location of said object to thereby produce an indicator on the mobile electronic appliance regarding the location of said object relative to said rear of said vehicle and wherein
    said sensor device is provided with a power source and wherein said sensor device is mountable and demountable from said rear of said vehicle by a portable mounting bracket readily attachable and detachable to said vehicle
    and wherein
    wherein said portable mounting bracket has a U-shaped configuration and a semi-circular shape on a bottom portion and an open portion on a top portion and wherein said portable mounting bracket is provided with an internal groove and a moisture weep hole on said bottom portion of said portable mounting bracket wherein said sensor device is insert able into said top of said portable mounting bracket vertically to move downwardly along said internal groove wherein said sensor device rests on said bottom of said portable mounting bracket and wherein said portable mounting bracket is provided with a magnet having a U-shaped configuration allowing said portable mounting bracket to be attachable and detachable to said rear of said vehicle to thereby aide a driver of said vehicle to maneuver said vehicle in a rearward direction and avoid said object in the path of the vehicle.

4. The system of claim 3 wherein said sensor drive comprises an electromagnetic sensor which sends out electromagnetic waves which can impact and reflect off of said object and return electromagnetic waves back to said electromagnetic sensor device such that said sensor device can determine and create an electronic signal representing the distance and location of said object relative to said sensor device.

5. A system for aiding in the reversing of a vehicle the system comprising:

at least one sensor device capable of sensing and object in a path to the rear of said vehicle wherein the sensor device is a proximity sensor which can determine the distance and location of said sensor device relative to said object in said path and wherein the sensor device produces a signal representing said distance and location, and wherein the sensor device is provided with means for communicating with a mobile electronic appliance which processes said signal representing said distance and location of said object to thereby produce an indicator on the mobile electronic appliance regarding the location of said object relative to said rear of said vehicle and wherein said sensor device is provided with a power source and wherein said sensor device is mountable and demountable from said rear of said vehicle by a portable mounting bracket readily attachable and detachable to said vehicle and wherein the means for communicating said sensor device with said electronic appliance comprises a local area networking computer system and wherein said mobile electronic appliance is provided a computer software application for processing said signal representing the distance and location of said object from said sensor device to said object to produce said visual display showing the location of said object relative to said rear of said vehicle and wherein said mobile electronic appliance comprises an electronic tablet and wherein said portable mounting bracket has a U-shaped configuration and a semi-circular shape on a bottom portion and an open portion on a top portion and wherein said portable mounting bracket is provided with an internal groove and a moisture weep hole on said bottom portion of said portable mounting bracket wherein the sensor device is insert able into said top of said portable mounting bracket vertically to move downwardly along said internal groove wherein said sensor device rests on said bottom of said portable mounting bracket and wherein said portable mounting bracket is provided with a magnet having a U-shaped configuration allowing said portable mounting bracket to be attachable and detachable to said rear of said vehicle to thereby aide a driver of said vehicle to maneuver said vehicle in a rearward direction and avoid said object in the path of the vehicle.

6. The system of claim 5 wherein said sensor device comprises an electromagnetic sensor which sends out electromagnetic waves which can impact and reflect off of said object and return electromagnetic waves back to said electromagnetic sensor such that said sensor device can determine and create au electronic signal representing the distance and location of said object relative to said sensor device.

7. The system of claim 5 wherein said sensor device comprises an ultrasonic sensor which sends out sound waves which can impact and reflect off of said object and return sound waves back to said ultrasonic sensor such that said sensor device can determine and create an electronic signal representing the distance and location of said object relative to said sensor device.

* * * * *